Oct. 22, 1963  T. D. NATHAN  3,107,922
SLIT-SURFACED O-RING AND ITS USE
Filed March 10, 1961  2 Sheets—Sheet 1

INVENTOR.
TRACY D. NATHAN
BY
ATTORNEY

Oct. 22, 1963     T. D. NATHAN     3,107,922

SLIT–SURFACED O–RING AND ITS USE

Filed March 10, 1961     2 Sheets–Sheet 2

INVENTOR.
TRACY D. NATHAN

BY *[signature]*

ATTORNEY

United States Patent Office 3,107,922
Patented Oct. 22, 1963

3,107,922
SLIT-SURFACED O-RING AND ITS USE
Tracy D. Nathan, Cuyahoga Falls, Ohio, assignor to Hamilton Kent Manufacturing Company, Kent, Ohio, a corporation of Ohio
Filed Mar. 10, 1961, Ser. No. 95,453
4 Claims. (Cl. 277—168)

This invention relates to an elastomeric O-ring and its use to seal the joint between the telescoped ends of two adjoining pipes which are designed to carry a gas or a liquid under pressure. The joint may be between a bell on one pipe and a spigot on the other pipe, or between a tongue on the end of one pipe and a groove in the end of the other pipe. The shape of the pipe ends is not important. The outer surface of the inner end may be cylindrical or it may taper gradually toward the pipe end.

The O-ring is compressed between the two pipe ends. When compressed, the surface tension of an ordinary O-ring increases and the surface of the ring hardens so that it does not as readily conform to a surface against which it is pressed. Also, the stretched rubber at the surface of the ring ages more rapidly than when the ring is not under tension. It has been proposed in my application Serial No. 857,861, filed December 7, 1959, and now abandoned, to overcome this increase in surface tension by providing several rather wide grooves extending the whole circuit of an O-ring used in this manner, and spaced equi-distantly from one another about the ring so as to be intersected by a cross section of the ring, and such O-rings have met with limited success. The chief disadvantage in such grooved rings arises from the fact that it is difficult to prevent an O-ring from becoming twisted when it is used to seal the telescoped ends of a pipe. When twisted so that one portion of a groove is exposed to the pressurized fluid within the pipes and another portion is exposed to the atmosphere, it is very difficult to prevent loss of fluid through the groove even though there is a tendency for the groove to become obliterated wherever it is in pressure contact with a surface of one of the pipes. However, pressure contact has not satisfactorily sealed off the wider grooves of the prior art.

According to this invention, the surface of an O-ring is provided with a number, and at least three, knife-like slits which extend throughout the entire circuit of the O-ring. By providing at least three such slits uniformly spaced about the O-ring there is always at least one slit in that portion of the surface of the O-ring which is exposed to the pressurized contents of the pipes. This is true even though the O-ring is twisted as it is placed between the pipe ends.

The slits reduce the surface tension of the O-ring, making it more readily conform to irregularities in the pipe surfaces. By providing openings through the O-ring its entire body is softened so that it more readily conforms to the pipe irregularities. For this purpose, the openings are advantageously off-set and located between the slits.

Where any portion of a knife-like slit in the surface of the O-ring is pressed against either pipe surface, the ring is flattened and opposite surfaces of the slit are pressed toward one another so that there is no significant leakage of liquid through the slit thus closed, from within the pipe structure to the surroundings. If the slit is a straight radial slit, the pressure obliterates the slit entirely. The same is largely true of any non-radial straight slit, but if one surface of a slit extends beyond the other that surface is pressed into conformity with the portion of the pipe surface which it contacts. Substantially the same is true of any exposed surface of a branched or non-straight slit: any exposed surface tends to conform to the shape of the portion of the pipe which it contacts. The pressure of the pipes, wherever they contact the ring, closes any openings in the ring surface caused by distortion of a slit. Thus, any slit is sealed wherever it contacts either pipe and none of the fluid leaks to the atmosphere from a portion of the slit which is exposed to contact with fluid within the pipes.

The slit-surfaced O-ring of this invention is self-sealing by the pressurized fluid within the pipe spreading any portion of the slit exposed to it; and yet it is non-leaking even though twisted when installed.

The O-ring is made of natural rubber, neoprene or other elastomer. It is inert with respect to the gas or liquid within the pipe.

The invention will be further described in connection with the accompanying drawings, in which—

Figure 1:
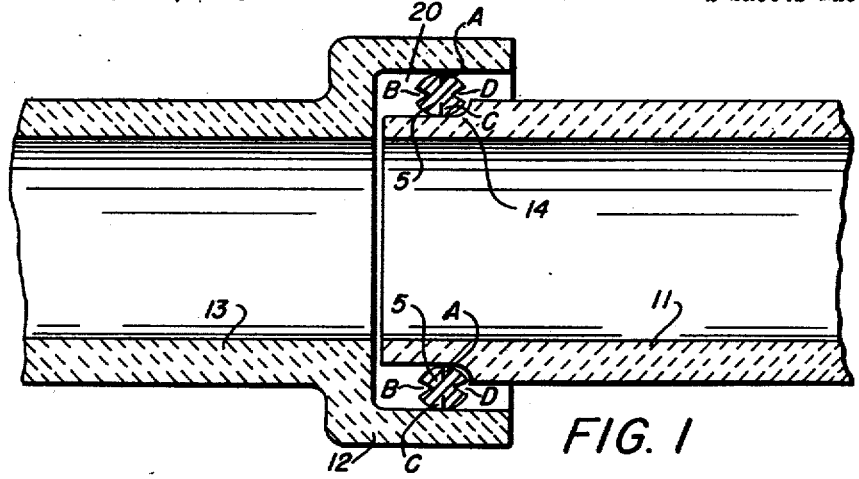
FIG. 1 illustrates an O-ring in the joint between the bell and spigot of two pipe ends.
Figure 2:
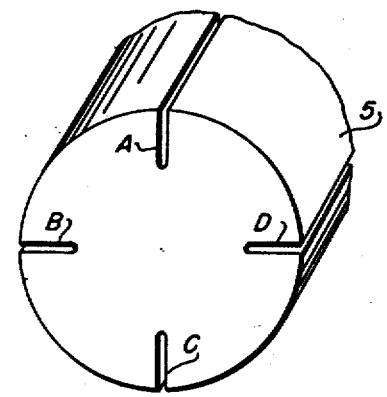
FIG. 2 is a section through this O-ring when not under tension.

The O-ring 5 of FIGURES 1 and 2 is provided with four radial slits identified by the letters A, B, C and D. These may be formed in the O-ring at any time. For instance, the material for the O-ring may be extruded as cylindrical tubing. Then, before or after curing, the tubing can be drawn through a second die to form the knife-like slits. The walls of the slits may be spaced a slight distance, as in FIGURES 1–4, or they may be in contact, as in FIGURES 5–7. If there is any substantial space between the walls they will not seal against one another when pressure is applied to the surface of the tubing at the end of the seal, and there will be leakage of liquid from within the pipe.

FIGURE 1 shows the O-ring between the spigot 10 of the pipe 11 and the bell 12 of the pipe 13. This is illustrative. The shoulder 14 is unnecessary. The two pipes may be joined by a tongue and groove joint instead of a bell and spigot joint. The O-ring may be used to seal the joint between the ends of pipes telescoped together in any similar manner. Packing is unnecessary but it may be used.

The fluid in the pipe, whether a gas or liquid, is under pressure. It fills the chamber 20 and enters the slit B and presses its sides apart. The pressure of the pipes which flattens the ring, spreads the slit D, but to a less extent than the slit B. The spreading of the slits lessens the tension on the surface of the ring, so that instead of becoming relatively rigid under pressure, the surface retains its relatively soft, flexible character and forms a good seal against the two pipe surfaces. Furthermore, if the O-ring is of natural rubber or the like, degeneration such as occurs when such rubber is under tension is retarded or eliminated.

The section shown in FIGURE 1 shows the slits A and C in pressure contact with the respective pipes. The compressed ring is flattened where contact is made and this presses the walls of these slits together. If the ring is not twisted, FIGURE 1 illustrates a section through all portions of the joint. Practically, all rings are twisted some, and may be twisted a good deal so that one portion of a slit is exposed to the pressurized fluid within the chamber 20, and another portion is exposed to the atmosphere. In fact, the ring may be so twisted that several portions of a slit are exposed to the pressurized fluid within the chamber 20 and several portions are exposed to the atmosphere. It is an important characteristic of the knife-like slits in the ring of this invention between each two such spread portions (i.e. one portion exposed to the pressurized fluid and one portion exposed to the atmosphere), that they are sealed into contact with one another wherever a pipe surface presses against them. Thus, with such a ring no leakage occurs because although a knife-like slit is spread wherever it is exposed to the pressurized fluid in the pipe and also wherever it is exposed to the atmosphere, it is sealed tight where it contacts the pipe between each two such spread portions. Consequently, fluid in a spread portion within the pipe can not travel to a spread portion exposed to the atmosphere. The tight seals where the ring contacts the pipe prevent such leakage. This is true whether the slits are true knife slits (as in the O-ring of FIGURES 5–7) or the walls of the slits are spaced a very short distance from one another (as in the O-rings of FIGURES 1–4).

FIGURE 1 is a cross section of one portion of the pipe joint, but in a cross section through an adjoining portion of the joint the ring may have twisted so that slits B and D are in contact with the pipes. Wherever the slits are in pressure contact with the pipe surfaces, they are sealed so that no leakage of the pressurized fluid occurs.

Figure 3:
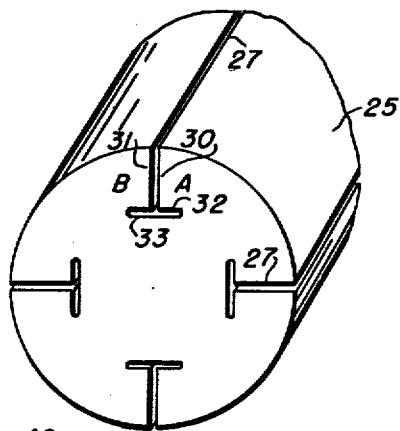
FIG. 3 is a section through a modified O-ring.

FIGURE 3 shows a modified form of O-ring 25 provided with inverted T-slits 27. These permit not only radial movement of one slit surface against another when the ring is twisted, but also permit separation of the slit surfaces at a cross bar of a T. Thus, if the O-ring is twisted counterclockwise against either pipe surface a part of the slit surface of the portion B of the ring may become separated from a portion of the slit surface of the portion A of the ring. The two radial portions need not be separated to form a V-groove because the surface 30 of the portion A may slide against the surface 31 as the surface 32 separates from the surface 33. Thus the outer part of the surface 30 may be in pressure contact with the wall of the pipe as the remainder of the surface 30 contacts the surface 31. Any portion of a slit surface in contact with a pipe surface is pressed into substantially flat sealing contact with it. Where the O-ring is compressed by contact with a pipe surface the slit surfaces located interiorly of the ring are pressed into contact with one another and form a tight seal, so that no gas or liquid can escape.

Figure 4:
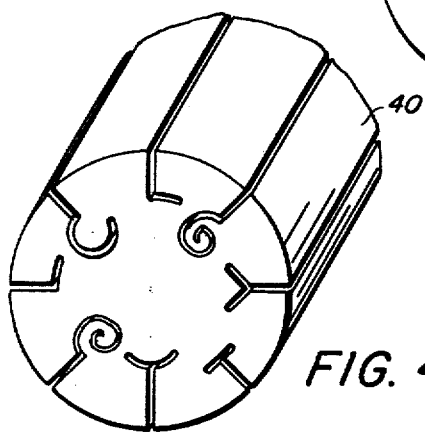
FIG. 4 is a section through an O-ring of other design.

FIGURE 4 illustrates an O-ring 40 which includes slits of various designs. Regardless of the shape of the slits, all portions of the O-rings located in pressure contact with a pipe surface form a tight seal. The intent of FIGURE 4 is merely to indicate the great variety of slits which may be used; and that they may be used in any combination.

Figure 6:
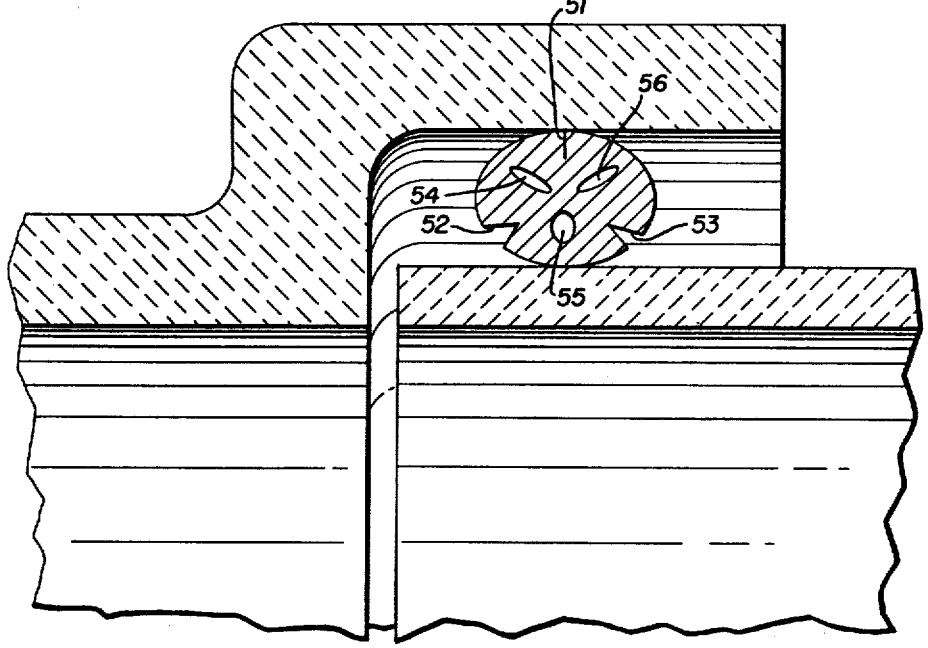
FIG. 6 is a section of the O-ring of FIGURE 5 compressed in a pipe joint.
Figure 5:
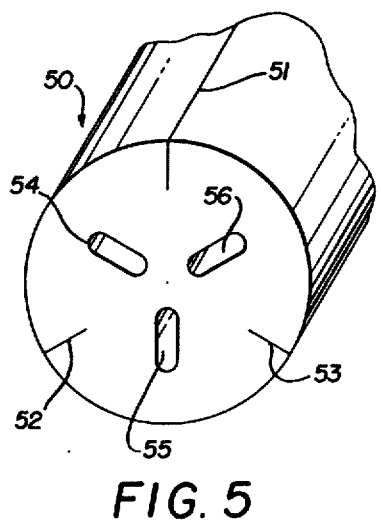
FIG. 5 is a section through another O-ring.

FIGURE 5 illustrates an O-ring 50 with three radial knife slits 51, 52 and 53. Between each two knife slits is an opening 54, 55 or 56. These openings are preferably elongated radially. They are distorted (as illustrated in FIGURE 6) when the O-ring is subjected to pressure. When used in a pipe joint, the slits and openings may be in any position relative to the pipes, and ordinarily different portions of the ring will be in different relative positions with respect to the pipes. FIGURE 6 is therefore illustrative only. Any number of slits and openings can be used, but three is preferred.

When the slit 51 is in pressure contact with a pipe surface, as in FIGURE 6, the opposite opening 55 is widened. Slits 52 and 53 are spread and openings 54 and 56 are narrowed. The contact of the pressurized fluid in the slit 52 makes it open wider than slit 53, providing a larger area of contact between the O-ring and each pipe. The openings soften the body of the O-ring, making the surfaces in contact with the pipes more easily deformed. The openings are advantageously located between the slits, away from the center of the O-ring, i.e. relatively near the surface of the O-ring. They are also advantageously elongated radially.

Figure 7:
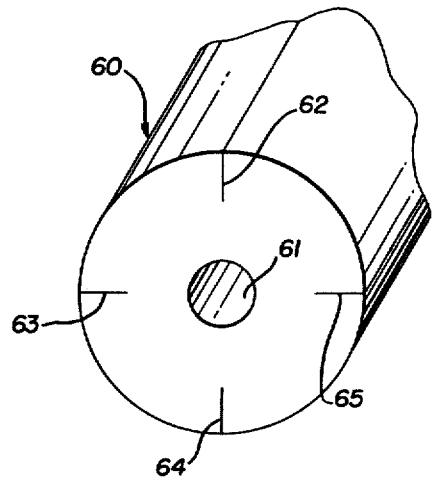
FIG. 7 is a section through an O-ring of still another design.

However, other opening arrangements soften the O-ring, providing larger areas of surface contact between the pipes and the O-ring. FIGURE 7 illustrates a modified structure. The O-ring 60 is provided with a circular opening 61 which is concentric with the O-ring. This opening softens the entire body of the O-ring. Four radial slits 62, 63, 64 and 65 are shown. These are preferably spaced equidistantly from one another, but this is not necessary provided there is one slit exposed to the interior of the pipes.

Knife slits (FIGURES 5–7) may be used without openings, and slits with the walls spaced a slight distance from one another (FIGURES 1–4) can be used in the surface of O-rings containing one or more openings that soften the O-ring. The nature of the fluid within the pipes and its pressure make one type of O-ring structure rather than another, preferable for a particular installation.

Although the surface slits open up where subjected to gas or liquid under pressure, whether or not there are openings within the ring, and the resulting expansion of the diameter of the ring tightens the seal which it forms, any portion of a slit which is in contact with one of the pipes is tightly closed due to the pressure of the pipe against it so that gas or liquid from within the pipes entering an opened portion of the slit does not pass to a portion of the slit which is exposed to the atmosphere.

The surface slits relieve the surface tension generated by subjecting the O-ring to pressure. Thus, in FIGURE 1 slits B and D are opened by the pressure of the pipes, but just as slit B is opened wider than slit D, any slit exposed to the pressurized fluid within the pipes is opened wider than the slits exposed to the atmosphere. The pressure of the pipes against the ring, while it opens any slit subjected to the pressure of the fluid within the pipes, flattens the O-ring and presses together the walls of the slits in the areas of the O-ring which contact the pipes. By providing at least three slits there are always at least two slits away from the contact areas to relieve the surface tension. By relieving the surface tension the O-ring is softer and more flexible, and forms a better seal and, furthermore, a rubber such as natural rubber, when not compressed, does not deteriorate as fast as when it is under tension.

Although the slits are shown as equally spaced around an O-ring, the distance between them need not be the same. Their depth may be varied. Many shallow slits may be used instead of a few deeper slits, as illustrated in the drawings.

This is a continuation-in-part of my application Serial No. 857,860, filed December 7, 1959, and now abandoned.

The invention is covered in the claims which follow.

What I claim is:

1. The combination of two pipes with an elastomeric O-ring forming a seal in a joint between an end of the first pipe within an end of the second pipe, which combination is adapted to convey fluid under pressure, the O-ring being generally circular in cross section and compressed between the two pipe ends with its inner surface exposed to the contents of the pipes, the improvement which comprises a small number and at least three, substantially evenly spaced slits in the surface of the O-ring which extend throughout the entire circuit of the O-ring, the space between each two slits being constant throughout the whole circuit of the O-ring, and a plurality of separate openings within the O-ring which extend throughout the circuit of the O-ring, each of which openings is at substantially the same distance from the center of the ring, the openings being substantially evenly spaced in the ring.

2. The combination of claim 1 in which there are the same number of slits and openings in the O-ring with one opening between each two slits.

3. An elastomeric O-ring which is generally circular in cross section, with a small number of at least three slits in its surface which extend throughout the entire circuit of the O-ring, the slits being substantially evenly spaced, and an opening between each two slits which extends throughout the circuit of the O-ring, each of which openings is at substantially the same distance from the center of the ring, the openings being substantially evenly spaced in the ring.

4. The O-ring of claim 3 in which each opening is elongated radially, and the slits are generally radial.

References Cited in the file of this patent

UNITED STATES PATENTS

| 2,272,115 | Halkyard | Feb. 3, 1946 |
| 2,521,248 | Parker | Sept. 5, 1950 |
| 2,723,142 | Stebbins | Nov. 8, 1955 |
| 2,729,478 | Chambers et al. | Jan. 3, 1956 |

FOREIGN PATENTS

| 583,734 | Germany | June 14, 1932 |

UNITED STATES PATENT OFFICE
CERTIFICATE OF CORRECTION

Patent No. 3,107,922                  October 22, 1963

Tracy D. Nathan

It is hereby certified that error appears in the above numbered patent requiring correction and that the said Letters Patent should read as corrected below.

Column 4, line 68, for "The" read -- In the --.

Signed and sealed this 14th day of April 1964.

(SEAL)
Attest:
ERNEST W. SWIDER

EDWARD J. BRENNER

Attesting Officer

Commissioner of Patents